United States Patent Office 3,470,174
Patented Sept. 30, 1969

3,470,174
CYCLODIENE CARBOX AMIDES
Gerhard H. Alt, Creve Coeur, Mo., assignor to Monsanto Company, St. Louis, Mo., a corporation of Delaware
No Drawing. Filed May 23, 1966, Ser. No. 551,962
Int. Cl. C07c *103/86;* C07d *87/00, 29/00*
U.S. Cl. 260—247.7
9 Claims

ABSTRACT OF THE DISCLOSURE

Compounds of the formula

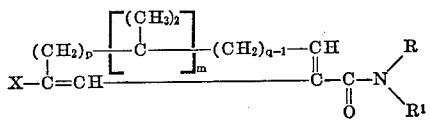

wherein $m$ is an integer from zero to one, $p$ and $q$ are integers from one to three, X is selected from the group consisting of hydrogen, chlorine and methyl; and R and $R^1$ are selected from the class consisting of alkyl up to 12 carbon atoms and the moieties such that R and $R^1$ together is selected from the class consisting of $$-CH_2(CH_2)_3CH_2-, -CH_2(CH_2)_4CH_2-$$
$$-CH_2CH_2OCH_2CH_2-, -CH_2CH_2CH_2-$$

and $$-CH_2(CH_2)_2CH_2-$$

These compounds are useful as animal feeds, providing growth stimulation and inhibition of parasitic helminths.

---

This invention relates to a new class of chemical compounds and novel methods for their preparation. More specifically this application describes and claims compositions which are useful animal feeds, providing growth stimulation and inhibition of parasitic helminths in animals fed thereon.

The new compounds have the formula

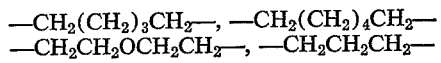

wherein $m$ is an integer from zero to one, $p$ and $q$ are integers from one to three, X is selected from the class consisting of hydrogen, chlorine and methyl, and wherein R and $R'$ are selected from the class consisting of alkyl of up to 12 carbon atoms and the moieties such that R and $R'$ together is selected from the class consisting of $$-CH_2(CH_2)_3CH_2-, -CH_2(CH_2)_4CH_2-$$
$$-CH_2CH_2OCH_2CH_2-, -CH_2CH_2CH_2-$$

and $$-CH_2(CH_2)_2CH_2-$$

The new compounds are prepared by the reaction

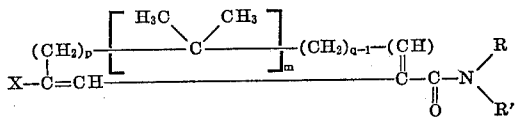

This reaction is conducted by heating the reactant at temperature between 50 and 100° C. in an aqueous organic solvent. Suitable solvents are those which are at least partly soluble in water, for example, ethanol, acetone, and ethylene glycol and other alcohols and ketones which are soluble in water. Heating at reflux temperatures provides a convenient method of maintaining control of the reaction.

Further details of the new compounds and methods of preparation are set forth in the following specific examples:

EXAMPLE 1

A compound of the formula

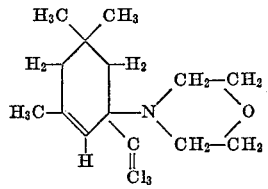

was dissolved in acetone and heated at reflux temperature for two hours. The acetone was evaporated and the resulting product was identified as having the structure

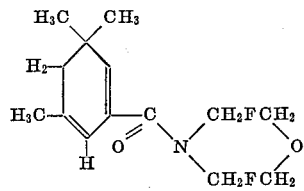

EXAMPLE 2

An ethanol solution of N-(1-trichloromethylcyclohex-2-enyl)pyrrolidine was heated at reflux for three hours. The resulting product was found to be that of the formula

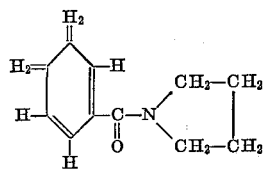

EXAMPLE 3

Using the procedure of Example 1, N(1-trichloromethyl-3-chloro-5,5-dimethylcyclohex-2-enyl) morpholine was converted into a compound of the formula

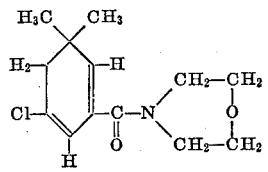

EXAMPLE 4

By the procedure of Example 2, N(1-trichloromethyl-3-methylcyclohex-2-enyl) pyrrolidine was converted to a compound of the formula

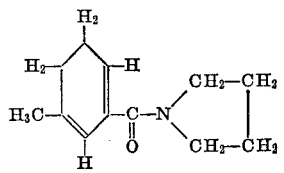

EXAMPLE 5

N,N-dimethyl(1-trichloromethyl - 3 - methylcyclohex-2-enyl) amine was refluxed in acetone for two hours. The product recovered from the reaction mixture was identified as that of the formula

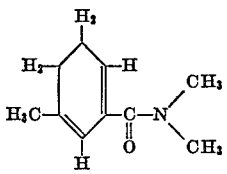

EXAMPLE 6

A compound of the formula

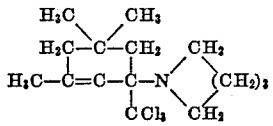

was reacted by the procedure of Example 1. The resulting product was identified as that of the formula

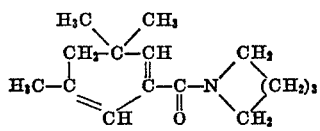

EXAMPLE 7

Using the procedure of Example 2 except that the remaining salt was substituted by that of the compound:

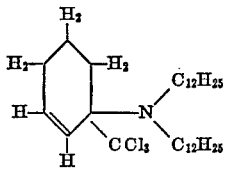

The resulting compound was found to have the formula

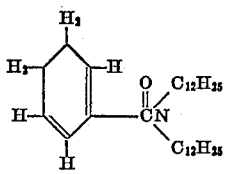

I claim:
1. A compound of the formula

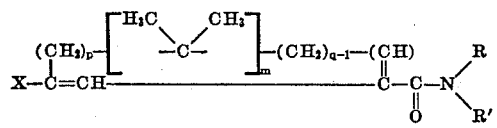

wherein $m$ is an integer from zero to one, $p$ and $q$ are each integers from one to three, wherein X is selected from the class consisting of chlorine, methyl and hydrogen and wherein R and R' are each selected from the class consisting of alkyl up to 12 carbon atoms and such alkyl or alkoxy moieties that R and R' together is selected from the class consisting of —$CH_2CH_2CH_2$—,

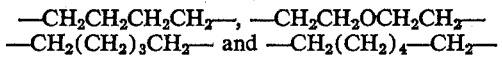

2. The compound of claim 1 wherein $m$ is one, $p$ and $q$ are each one, X is methyl and R and R' together is —$CH_2CH_2OCH_2CH_2$—.

3. The compound of claim 1 wherein $m$ is zero, $p$ is two, $q$ is one, X is hydrogen and R and R' together is —$CH_2(CH_2)_2CH_2$—.

4. The compound of claim 1 wherein each of $m$, $p$ and $q$ is one, X is chlorine and R and R' together is

—$CH_2CH_2OCH_2CH_2$—

5. The compound of claim 1 wherein $m$ is zero, $p$ is one, $q$ is two, wherein X is methyl and wherein R and R' together is —$CH_2(CH_2)_2CH_2$—.

6. The compound of claim 1 wherein $m$ is zero, $p$ is one and $q$ is two, and wherein X is methyl and wherein each of R and R' is methyl.

7. A method of preparing a compound of the formula

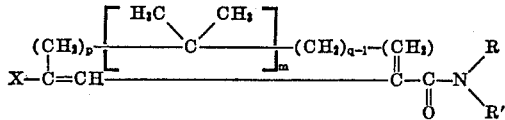

wherein $m$ is an integer from zero to one, $p$ and $q$ are integers from one to three, wherein X is selected from the class consisting of chlorine, methyl and hydrogen and wherein R and R' are each selected from the class consisting of alkyl up to 12 carbon atoms and such alkyl or alkoxy moieties that R and R' together is selected from the class consisting of —$CH_2CH_2CH_2$—, —$CH_2CH_2CH_2CH_2$—, —$CH_2CH_2OCH_2CH_2$—
—$CH_2(CH_2)_3CH_2$— and —$CH_2(CH_2)_4$—$CH_2$— which comprises heating at reflux in an aqueous organic solvent a compound of the formula

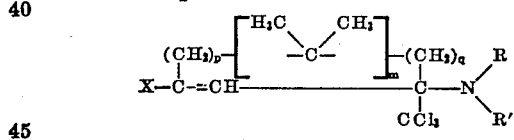

8. The method of claim 7 wherein $m$ is one, $p$ is one and $q$ is one, wherein X is methyl and wherein R and R' together is —$CH_2CH_2OCH_2CH_2$—.

9. The method of claim 7 wherein $m$ is one, $p$ is one and $q$ is one, and wherein X is chlorine and wherein R and R' together as substantially and described herein.

No references cited.

ALEX MAZEL, Primary Examiner
J. TOVAR, Assistant Examiner

U.S. Cl. X.R.
260—239, 294.7, 326.5, 557; 424—244, 248, 267, 274